(12) United States Patent
Standaert et al.

(10) Patent No.: US 11,134,615 B2
(45) Date of Patent: Oct. 5, 2021

(54) OVERRUNNING CLUTCH FOR A DRIVE MECHANISM OF AN AGRICULTURAL BALER

(71) Applicant: CNH Industrial Belgium nv, Zedelgem (BE)

(72) Inventors: Wouter Standaert, Knesselare (BE); Xavier G. J. M. Bonte, Zuidzande (NL); Jeroen Devroe, Izegem (BE); Dries Liefooghe, Alveringem (BE); Bram Rosseel, Snellgem (BE); Dieter Kindt, Vladslo (BE); Thomas Vandaele, Zedelgem (BE)

(73) Assignee: CNH Industrial America LLC, New Holland, PA (US)

( * ) Notice: Subject to any disclaimer, the term of this patent is extended or adjusted under 35 U.S.C. 154(b) by 181 days.

(21) Appl. No.: 16/183,691

(22) Filed: Nov. 7, 2018

(65) Prior Publication Data

US 2019/0133046 A1     May 9, 2019

(30) Foreign Application Priority Data

Nov. 7, 2017 (BE) .................................. 2017/5798

(51) Int. Cl.
| | | |
|---|---|---|
| *A01F 15/04* | (2006.01) | |
| *A01F 15/10* | (2006.01) | |
| *F16D 11/16* | (2006.01) | |
| *F16D 41/066* | (2006.01) | |
| *F16D 41/063* | (2006.01) | |

(Continued)

(52) U.S. Cl.
CPC .......... *A01F 15/101* (2013.01); *A01F 15/042* (2013.01); *A01F 15/0841* (2013.01);
(Continued)

(58) Field of Classification Search
CPC ................ A01F 15/101; A01F 15/0841; A01F 15/042; A01F 2015/102; A01F 2015/0866;
(Continued)

(56) References Cited

U.S. PATENT DOCUMENTS

| 4,083,441 A | 4/1978 | Young |
| 4,106,268 A | 8/1978 | White et al. |

(Continued)

FOREIGN PATENT DOCUMENTS

| EP | 0636308 A1 | 2/1995 |
| WO | 2012/092313 A1 | 7/2012 |
| WO | 2012092313 A1 | 7/2012 |

OTHER PUBLICATIONS

Extended European Search Report for EP Application No. 18203454.6 dated Mar. 18, 2019 (7 pages).

*Primary Examiner* — Jimmy T Nguyen
(74) *Attorney, Agent, or Firm* — Peter Zacharias; Patrick Sheldrake

(57) ABSTRACT

An agricultural baler including a bale case, a plunger, a duct, and a stuffer unit, operably associated with the duct. The stuffer unit includes a fork assembly including tines, a drive mechanism acting on the fork assembly, and a clutch arrangement for selective coupling the drive mechanism to a power source of the baler. The clutch arrangement includes a selectively operable dog clutch including a driving clutch member and a driven clutch member. The driving and the driven clutch member are configured for selectively engaging each other in one direction of rotation of the driving clutch member relative to the driven clutch member. The clutch arrangement furthermore includes an overrunning clutch associated with the driving clutch member and the driven clutch member.

17 Claims, 10 Drawing Sheets

(51) Int. Cl.
*F16D 41/069* (2006.01)
*A01F 15/08* (2006.01)

(52) U.S. Cl.
CPC ............ *F16D 11/16* (2013.01); *F16D 41/063* (2013.01); *F16D 41/066* (2013.01); *F16D 41/069* (2013.01); *A01F 2015/102* (2013.01)

(58) Field of Classification Search
CPC .... F16D 41/063; F16D 41/066; F16D 41/069; F16D 11/16
See application file for complete search history.

(56) References Cited

U.S. PATENT DOCUMENTS

| | | | |
|---|---|---|---|
| 4,825,760 A * | 5/1989 | Weddeling | A01F 15/101 100/188 R |
| 4,862,797 A * | 9/1989 | Mathis | A01F 15/02 100/189 |
| 5,099,972 A * | 3/1992 | Ouchi | F16D 41/066 192/45.02 |
| 5,467,702 A | 11/1995 | Naaktgeboren et al. | |
| 8,291,818 B2 * | 10/2012 | Matousek | A01F 15/0825 100/189 |
| 8,561,532 B2 * | 10/2013 | Bergmann | B30B 9/3007 100/189 |
| 9,010,241 B2 | 4/2015 | Naakteboren et al. | |
| 9,426,944 B2 * | 8/2016 | Naeyaert | A01F 15/042 |
| 2010/0109280 A1 * | 5/2010 | Wills | F16D 41/066 280/214 |
| 2014/0076178 A1 | 3/2014 | Naaktgeboren et al. | |
| 2016/0014965 A1 | 1/2016 | Naeyaert et al. | |

\* cited by examiner

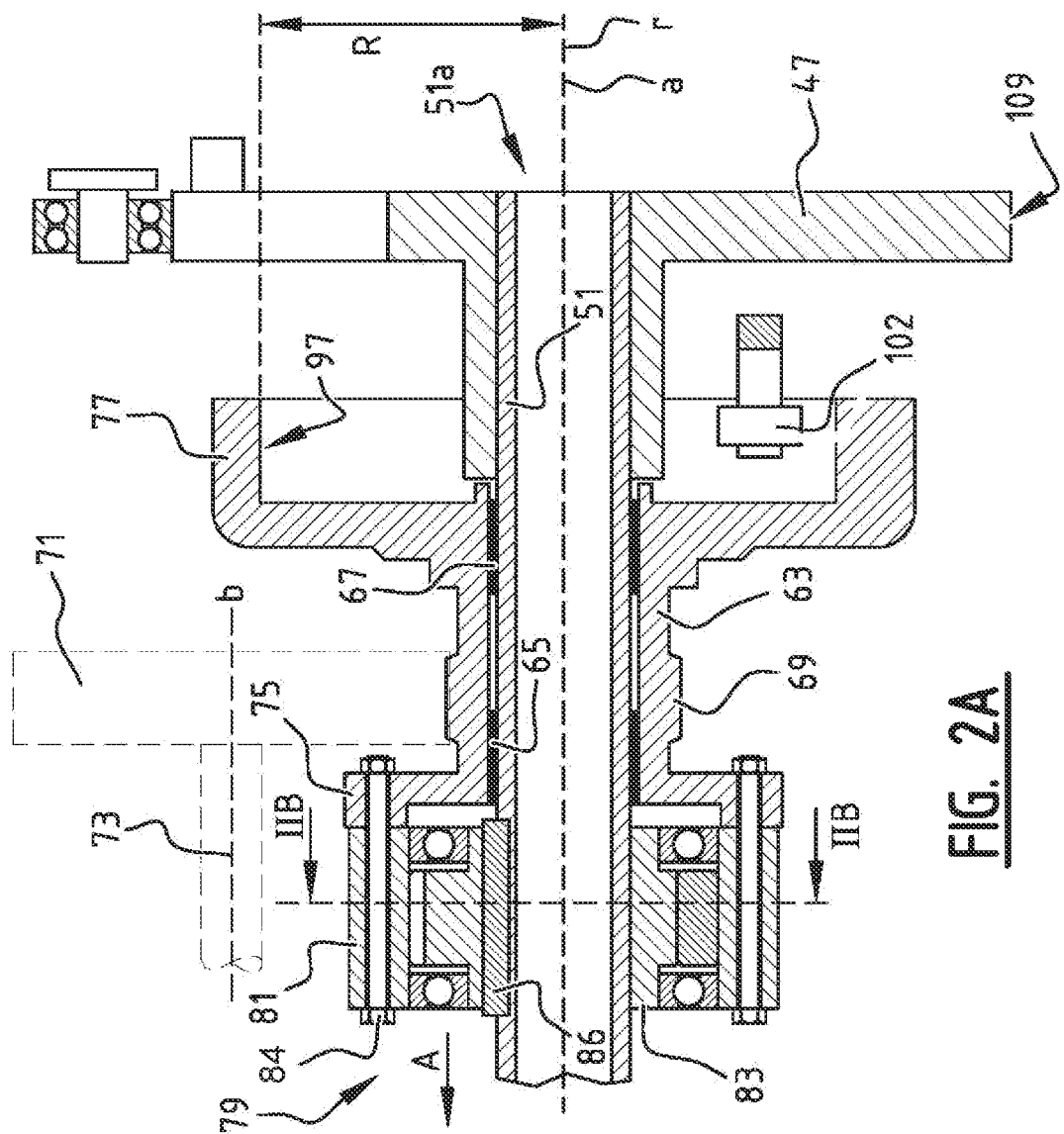
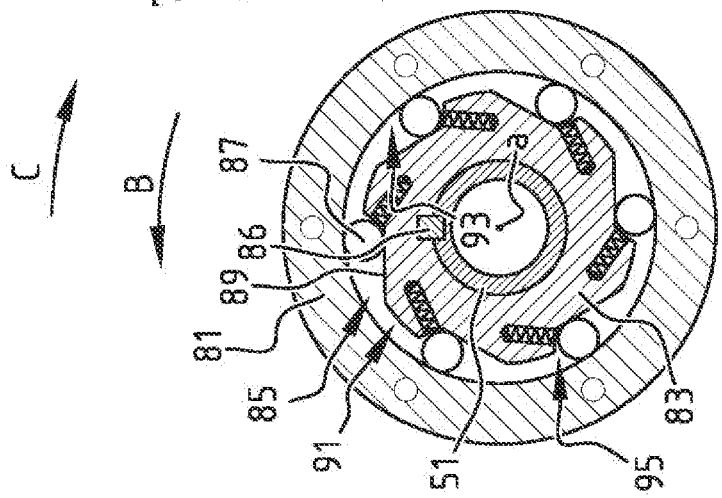
FIG. 2A
FIG. 2B

OVERRUNNING CLUTCH FOR A DRIVE MECHANISM OF AN AGRICULTURAL BALER

FIELD OF THE INVENTION

The present invention relates to agricultural balers for the formation of bales of crop material, such as hay, straw or silage in a bale chamber, and more particularly to the loading means for the transportation of said material from within a duct to the bale chamber.

BACKGROUND OF THE INVENTION

In a conventional agricultural baler hay, straw, silage or similar crop material that has been previously cut, windrowed or swathed, is picked up from the ground by a pick-up unit, fed into a duct and loaded in successive batches or charges into an elongated bale chamber by tines of a stuffer unit in timed sequence with a reciprocating plunger.

The plunger compresses the material into bales and, at the same time, gradually advances the bales towards the outlet of the bale chamber. As the bales reach a predetermined length as determined by a metering device, a knotter device is actuated which wraps cord, twine or other flexible binding material around the bale and secures the ends of the binding material together.

The stuffer unit is designed to quickly load charges of crop material into the bale chamber within the short interval during which the reciprocating plunger clears the entrance of the bale chamber. Typically this is accomplished by a fork assembly that comprises tines. A drive mechanism that is driven by a power source of the baler, acts on the fork assembly. When driven, the drive mechanism causes a movement of the tines along a path through the duct such that a charge of crop material that is located in the duct is engaged by the tines and loaded into the bale chamber. After loading the crop material into the bale chamber, the tines are moved out of the duct and returned towards the inlet of the duct such that the tines can be used for loading a subsequent charge of crop material into the bale chamber. The tines thus moved along a cyclic path. In the known balers of the above type the cyclic path is generally a kidney shaped path.

In known balers of the above type, the drive mechanism that acts upon the fork assembly is driven by the same power source that drives the plunger. Generally, the drive mechanism of the stuffer unit is coupled to a power take off of the main transmission that drives the plunger. It is known to couple the drive mechanism of the stuffer unit to the power source of the baler with a selectively operable clutch assembly in order to allow for changing the number of reciprocation cycles of the plunger in the baling chamber between successive loading cycles of the stuffer unit. This allows for instance for changing from one loading cycle of the stuffer unit for each reciprocation cycle of the plunger in the bale chamber, to one loading cycle of the stuffer unit for each two, three, four, etc., reciprocation cycle of the plunger in the bale chamber. By disengaging the drive mechanism of the stuffer unit the power source by means of the clutch assembly, the fork assembly is no longer driven and the tines stop moving along their path. Subsequently the movement of the tines is started again by coupling the drive mechanism of the stuffer unit to the power source by means of the clutch assembly.

Since the stuffer unit is required to load successive batches or charges of crop material into the bale chamber in timed sequence with the reciprocating plunger, the clutch assembly for coupling the drive mechanism of the stuffer unit to the power source, is required to allow for a motion of the tines that is synchronized with the motion of the plunger. Furthermore, due to the cyclic motion of the tines along the path of movement thereof and to the fact that the tines are under load along only a part of the path, i.e. the part where the tines engage the charge of crop material, the drive load pattern of the stuffer unit of a baler of the above type is very jumpy and it even changes torque direction a couple of times during a load cycle performed by the stuffer unit. In view thereof, the clutch assembly is required to be able to cope with change of torque direction.

In know balers of the above type, a clutch assembly that meets the above requirements is used that includes a selectively engageable dog clutch. The dog clutch provides positive coupling, i.e. coupling not by friction but by interference, that allows for accurate timing of the motion of the tines relative to the motion of the plunger. The employed dog clutch in certain known balers of the above type are configured for engaging and transmitting torque in only one direction of rotation. For coping with change of torque direction a permanently engaged friction brake is provided. A drawback of using the permanent friction brake is that energy is lost in the form of heat generated in the friction brake. The lost energy can no longer be used for operating the baler.

SUMMARY OF THE INVENTION

Embodiments of the present invention have as among others as its object to address the drawback of the use of the friction brake.

Thereto the present invention provides embodiments of a baler comprising a bale case, having a wall portion with an entrance opening for the introduction of crop material, a plunger, disposed for movement in the bale case to thereby compact said crop material into bales, a duct for the transportation of said crop material to said entrance opening, and a stuffer unit, operably associated with said duct. The stuffer unit comprises a fork assembly comprising tines, a drive mechanism acting on the fork assembly, and a clutch arrangement for selective coupling the drive mechanism to a power source of the agricultural baler. The clutch arrangement comprises a selectively operable dog clutch comprising driving clutch member and a driven clutch member that are arranged for rotation about a shared axis of rotation, wherein the driving clutch member and the driven clutch member are configured for selective engagement in one direction of rotation of the driving clutch member relative to the driven clutch member. The clutch arrangement furthermore comprises an overrunning clutch associated with the driving clutch member and the driven clutch member, that is configured for engaging in the opposite direction of rotation of the driving clutch member relative to the driven clutch member.

In such embodiments of a baler according to the invention the selectively operable dog clutch selectively provides a positive coupling between the driving clutch member and the driven clutch member in one direction of rotation of the driving clutch member relative to the driven clutch member for transmitting torque from the power source to the drive mechanism in that direction of rotation. The overrunning clutch provides coupling between the driving clutch member and the driven clutch member in the opposite direction of rotation of the driving clutch member relative to the driven clutch member, thereby allowing for transmission of torque from the drive mechanism to the power source in that opposite direction of rotation. The clutch assembly thus can cope with change of torque direction, without the application of a permanently engaged friction brake. In such embodiments of the baler according to the invention a dog clutch can be applied of the same type as in known balers, i.e. that is configured for engaging and transmitting torque in only one direction of rotation, without the use of a permanently engaged friction brake and without the energy losses associated therewith. The selectively operable dog clutch is preferably a one way clutch, i.e. a clutch that is configured for engaging and transmitting torque in only one direction of rotation, more in particular a positive one way clutch, that provides positive coupling, i.e. coupling not by friction but by interference.

In the known balers of the type wherein a permanently engaged friction brake is used for coping with changing torque directions, the brake not only provided for coping with change of torque direction, but also for stopping the motion of the tines when the selective operable dog clutch is disengaged and for holding the tines in the rest position where the tines are stopped until the selective operable dog clutch is again engaged. In an embodiment of the present invention a selectively engageable friction brake is used, instead of the permanently engaged friction brake, for stopping the tines once the selective operable dog clutch is disengaged and/or for holding the tines in the rest position where the tines are stopped until the selective operable dog clutch is again engaged. Alternatively, a permanently engaged friction brake is used for stopping the driven clutch member and holding the driven clutch member in place. Although such a permanently engaged friction brake would still be a source of energy loss, the energy loss can be less in view of the fact that such permanently engaged friction brake would have to provide less friction than the permanent friction brake that is presently used, since it would not have to cope with change of torque direction.

In a preferred embodiment of the present invention, the baler further comprises a cam arrangement comprising a cam and a cam follower, wherein one of the cam and the cam follower is associated with the driven clutch member and the other one of the cam and cam follower is arranged such that when the driven clutch member is rotated about its axis of rotation, the cam follower is in biased contact with and follows a cam surface of the cam over at least part of the angular positions of the driven clutch member about its axis of rotation, wherein the cam surface comprises a stop that is engaged by the cam follower when the driven clutch member is in an angular position about its axis of rotation that corresponds to a rest position thereof. In certain embodiments the rest position of the driven clutch member corresponds to a rest position of the tines.

In this preferred embodiment the angular rotation of the driven clutch member about its axis of rotation is stopped in a certain angular position that corresponds to a rest position thereof when the selectively operable dog clutch is disengaged and the cam follower engages the stop of the cam surface, and is held in said angular position as long as the driven clutch member is not driven. In this preferred embodiment, the cam arrangement stops and holds the driven clutch member in a certain angular position when the selectively operable dog clutch is disengaged, and therewith stops and hold the tines in a position that is associated with the angular position in which the driven clutch member is stopped and held. In this preferred embodiment a friction brake can be dispensed with.

In an advantageous embodiment of the invention wherein the baler comprises the cam arrangement, a resilient member is provided that is at least partly compressed or stretched when the cam follower is in contact with the cam surface of the cam. The compression or stretching of the resilient member provides the force for biasing the cam follower against the cam surface. Advantageously, the resilient member comprises a spring damper arrangement.

Embodiments of the invention can have differently embodied drive mechanisms and assemblies. In an advantageous embodiment of the present invention the drive mechanism comprises at least one first crank that is rotatable about a first axis of rotation and that is associated with the driven clutch member. In an advantageous embodiment thereof in combination with the above described cam arrangement according to an embodiment of the invention one of the cam and the cam follower is connected to or arranged on the first crank, wherein preferably the crank is embodied by a crank wheel having an outer circumferential surface that serves as the cam surface of the cam.

In an advantageous embodiment of the invention wherein the drive mechanism comprises at least one first crank, the fork assembly comprises at least one fork lever having arranged thereon the tines, and the fork lever is acted upon by the first crank at a first pivot point on the one hand, and operably supported at a second pivot point on the other hand. The combination of a crank and a fork lever, wherein fork lever is acted upon at a first pivot point on the one hand and is operably supported at a second pivot point on the other hand, allows to convert a uniform revolution of the crank pin that connects the crank to the fork lever along a circular path into a movement of the tines along a non-circular, for instance generally kidney-shaped, path with a varying speed. Although such non-circular, for instance generally kidney-shaped, path along which the tines are moved with a varying speed is advantageous for loading charges of crop material in the bale chamber, the accelerations and decelerations associated therewith in particular contribute to the changing torque directions. In this advantageous embodiment of the invention, the drawback of changing torque directions that is associated with the combination of a crank and a fork lever, wherein fork lever is acted upon at a first pivot point on the one hand and is operably supported at a second pivot point on the other hand, is less relevant since the clutch assembly can cope with such changing torque directions.

In a preferred embodiment of the baler according to the invention as described herein above having a fork lever, the fork lever is operably supported at the second pivot point by a guide, allowing relative movement of said fork lever to the second pivot point along a predetermined path relative to said lever. Preferably, said guide comprises a journal, coaxial with said second pivot point and cooperating with an oblong slot provided in said fork lever, and wherein preferably said journal fits closely between the longitudinal sides of said slot and that upon rotation of said crank, said second pivot point travels to and fro along a single line relative to and within said slot. In an advantageous embodiment thereof in combination with the above described cam arrangement according to the invention, the second pivot point is fixed to a support member that is movable relative to the drive shaft, and the one of the cam and the cam follower that is not connected to or arranged on the crank is connected to or arranged on said support member. In this embodiment the cam arrangement can additionally be used for moving the second pivot point relative to the axis of rotation of the crank in dependence on the angular position of the crank about its axis of rotation. Moving the second pivot point relative to the axis of rotation of the crank in dependence on the angular position of the crank about its axis of rotation allows for adjusting the speed course of the tines along the path of movement thereof, relative to an arrangement wherein the second pivot point is stationary relative to the axis of rotation of the crank. A baler with such a cam arrangement with a movable second pivot point is as such known from EP 0636 308, wherein the cam arrangement is used to decrease the speed of the tines along part of the path of movement of the ends thereof where the tines extend in the duct. In said prior art baler the cam arrangement has a cam follower that is in contact with a cam surface in angular positions of the crank about its axis of rotation that correspond to a part of the path of movement of the ends of the tines where the tines extend in the duct. By providing said prior art cam arrangement with a cam surface with a stop that is engaged by the cam follower when the crank is in an angular position about its axis of rotation that corresponds to a rest position of the fork assembly, either by extending the cam surface of the prior art arrangement or by providing an additional cam surface, the prior art baler can be advantageously provided with the clutch arrangement and cam arrangement so as to provide a baler according to the present advantageous embodiment.

In a further advantageous embodiment of the baler according to the invention as described herein above having a first crank and a fork lever, the stuffer unit further comprises at least one second crank rotatable about a second axis of rotation; and the second crank acts upon said fork lever at the second pivot point for moving said second pivot point relative to said second axis of rotation.

These features provide an alternative way of moving the second pivot point. In particular these features allow for providing a stuffing unit that selectively provides two paths of movement of the tines, in particular a so-called packer path of movement and a so-called stuffer path of movement. A baler with a stuffer unit that provides two paths of movement of the tines is as such known from WO2012/163903. In said known baler a first crank acting upon a first pivot point of a fork lever is selectively rotated about its axis of rotation while a second crank acting upon a second pivot point of the fork lever is continuously rotated about its axis of rotation. When the first crank is not rotated about its axis of rotation, the rotation of the second crank results in the tines being moved along a packer path of movement. When the first crank is rotated about its axis of rotation the combined rotation of the first crank and the second crank results in the tines being moved along a stuffer path of movement. Said prior art baler can advantageously be provided with the advantageous clutch arrangement as described herein above for selectively rotating said first crank so as to provide a baler according to the present advantageous embodiment.

In a preferred embodiment of the baler according to the invention wherein the stuffer unit further comprises a second crank acting upon the fork lever at the second pivot point, the fork lever is operably supported at the second pivot point by a guide, allowing relative movement of said fork lever to the second pivot point along a predetermined path relative to said lever. Preferably, said guide comprises a journal, coaxial with said second pivot point and cooperating with an oblong slot provided in said fork lever, and wherein preferably said journal fits closely between the longitudinal sides of said slot and that upon rotation of said crank, said second pivot point travels to and for along a single line relative to and within said slot.

In an alternative preferred embodiment of the baler according to the invention wherein the stuffer unit further comprises a second crank acting upon the fork lever at the second pivot point, the first crank acts upon the fork lever at the first pivot point via a cam track and cam track follower arrangement. In one embodiment thereof the position of the first pivot point is defined by a cam track on the fork arm engaged by a cam track follower acted upon by the first crank. In an alternative embodiment the position of the first pivot point is defined by a cam track that is acted upon by the first crank and that is engaged by a cam track follower on the fork lever.

In a further advantageous embodiment of the baler according to the invention the overrunning clutch is one of a roller ramp overrunning clutch, a sprag overrunning clutch, and a wedge ramp overrunning clutch.

In a further advantageous embodiment of the baler according to the invention the selectively operable dog clutch is a radial dog clutch.

In a further advantageous embodiment of the baler according to the invention one of the driving clutch member and the driven clutch member of the radial dog clutch is a pivotable dog lever and a the other one of the driving clutch member and the driven clutch member is a dog lever engagement member.

In a further advantageous embodiment of the baler according to the invention the selectively operable positive one way clutch is a single revolution clutch.

BRIEF DESCRIPTION OF THE FIGURES

The accompanying drawings are used to illustrate a non-limitative preferred exemplary embodiment of the present invention. The above stated and other advantages, features and objectives of the invention will become more apparent, and the invention better understood, from the following detailed description when read in combination with the accompanying drawings, in which:

FIG. 2A is longitudinal sectional view of a crank wheel arrangement of the baler of FIG. 1;

FIG. 2B is a cross sectional view of the crank wheel arrangement of FIG. 2A;

Terms such as "forward", "rearward", "left", "right", etc., when used in connection with the baler and/or components thereof are determined with reference to, and facing in, the direction of operative travel of the baler in the field.

DETAILED DESCRIPTION OF THE FIGURES

Figure 1:
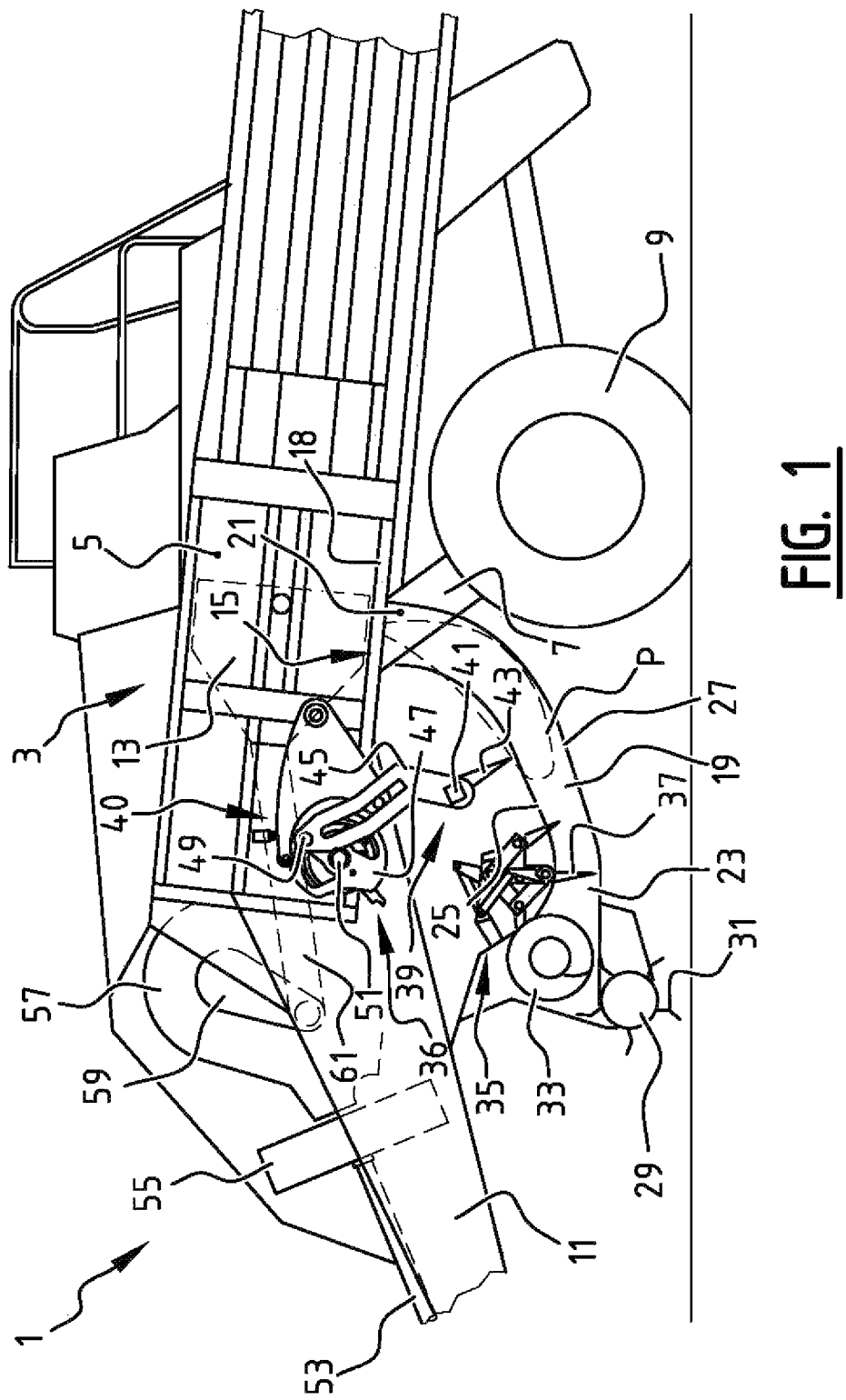
FIG. 1 is a fragmentary, diagrammatic side view of an embodiment of a baler according to the invention having a crank wheel arrangement acting on a fork lever of a stuffer unit.

In FIG. 1 a baler 1 is illustrated having a fore-and-aft extending bale case 3 with a rectangular cross section defining a baling chamber 5. The bale case 3 is supported in an upwardly and forwardly inclined manner by struts 7 having ground-engaging wheels 9 at their lowermost ends.

A downwardly and forwardly projecting tongue 11 at the front of the bale case 3 is adapted for hitching the baler 1 to a towing vehicle (not shown) for advancing the same across a field. An enclosed plunger 13 reciprocates fore-and-aft within the baling chamber for periodically compacting material presented to the chamber 5 through an inlet 15 in the floor 18 of bale case 3 across the full width thereof.

An upwardly curving loading duct 19 depends from the bale case 3 and has its upper discharge end 21 in registration with the inlet 15, while the lower receiving end 23 of the duct 19 is remote from inlet 15 and is disposed substantially forwardly thereof. The duct 19 has a curved top wall 25 which is provided with laterally spaced, longitudinal slots (not shown) extending the full length thereof, and a solid curved bottom wall 27.

The lower end 23 of the duct 19 is positioned directly behind a crop pick-up 29 which may be of any design capable of picking up windrowed or swathed crop material from the field and delivering the same rearwardly into the end 23 of the duct 19. In the illustrated embodiment, the pick-up 29 has a series of lifting tines 31 which sweep the crop upwardly to stub augers 33 which gather the crop centrally and deliver it rearwardly into the lower end 23 of the duct 19.

A packer unit 35 is positioned directly behind the crop pick-up 29 and above the duct end 23 for making a pre-compressed charge of material within the duct 19 preparatory to loading the bale case 3. It contains a plurality of forks with tines 37 which are moved to thereby project into the crop material in the lower end 23, push charges thereof rearwardly and upwardly in the duct 19 and retract therefrom while returning to their foremost position.

Behind the packer unit 35 and above the loading duct 19 is arranged a stuffer unit 36 having a stuffing fork assembly 39 for periodically sweeping an accumulated charge of crop material from the duct 19 into the bale case 3. The fork assembly 39 has a transverse tube 41 spanning the duct 19 above the latter, to which tube 41 a series of laterally spaced-apart, elongated tines 43 is attached. The tines 43 are spaced apart in accordance with the slots in the top wall 25 of duct 19, such that during the loading cycle the tines 43 may enter the duct 19 through said slots and move along the bottom wall 27 toward the inlet 15 of the bale case 3.

The fork assembly 39 also includes a pair of fork levers 45 at opposite ends of the tube 41, which fork levers 45 carry the tube 41 at their rearmost end. The fork assembly 39 is driven by a drive mechanism 40 that in the shown embodiments is a crank mechanism comprising a pair of cranks embodied as crank wheels 47. Each fork levers 45 is rotatably coupled at its foremost end with a respective one of the crank wheels 47 through a pivot 49. The crank wheels 47 are rigidly affixed to opposite ends of a support shaft 51 that spans the bale case 3 above the packer unit 35.

A power input shaft 53 along the tongue 11 carries a flywheel 55 at the upper end of said tongue 11, immediately adjacent a right angle gearbox 57 coupled with the input shaft 53. The gearbox 57 drives a pair of crank arms 59 which are rotatably linked to a pair of connecting rods 61 of the plunger 13. When rotating power from the towing vehicle is supplied to the input shaft 53, the gearbox 57 rotates the crank arms 59 to thereby reciprocate the plunger 13 within the bale case 3. The same gearbox 57 provides either directly or indirectly driving power to the fork arrangement 39, the packer unit 35, the pick-up 29 and the stub augers 33.

In FIG. 2A the left side crank wheel 47 is shown. The crank wheel 47 is rigidly affixed to an end 51a of the support shaft 51. The support shaft 51 extends in the direction indicated by arrow A to an opposite end (not shown) thereof that has rigidly affixed thereto the right side crank wheel. The longitudinal axis a of the support shaft 51 defines and coincides with the axis of rotation r of the left side crank wheel 47 and the right side crank wheel. The support shaft 51 is arranged in the baler 1 for rotation about its central longitudinal axis a. A drive shaft 63 is rotatably arranged on the support shaft 51 by means of bearings 65, 67. The drive shaft 63 is provided with teeth that mesh with a toothed wheel 71 that is affixed to an output shaft 73 of the gear box 57. The output shaft 73 is arranged for rotation about its central longitudinal axis b. The drive shaft 63 is at its ends provided with flanges 75, 77. The flange 75 at the inner end of the drive shaft 63 is mounted to an overrunning clutch 79.

As shown in FIG. 2B, the overrunning clutch 79 has two co-axial members, in particular an outer member 81 and an inner member 83, and a one way coupling mechanism 85 arranged between the outer member 81 and the inner member 83. The flange 75 at the inner end of the drive shaft 63 is mounted to the outer member 81 of the overrunning clutch 79 by means of bolts 84 such that rotation of the outer member 81 relative to the drive shaft 63 about the longitudinal axis a of the support shaft is blocked. The inner member 83 of the overrunning clutch 79 is arranged on the support shaft 51 and is coupled therewith by means of a spline 86 such that rotation of the inner member 83 relative to the support shaft 51 about the longitudinal axis a of the support shaft 51 is blocked. The overrunning clutch 79 is a roller ramp overrunning clutch. The one way coupling mechanism 85 arranged between the outer member 81 and the inner member 83 comprises rollers 87 that roll up a ramp 89 provided on the outer radial surface 91 of the inner member 83 in case the outer member 81 rotates relative to the inner member 83 about the longitudinal axis a of the support shaft 51 in the direction of arrow B. The ramps 89 and the inner radial surface 93 of the outer member 81 form a wedge there between such that the rollers 87 get wedged between the outer radial surface 91 of the inner member 83 and the inner radial surface 93 of the outer member 81 when the rollers 87 roll up the ramps 89. Once the rollers 87 are wedged between the outer radial surface 91 of the inner member 83 and the inner radial surface 93 of the outer member 81 further rotation of the outer member 81 relative to the inner member 83 about the longitudinal axis a of the support shaft 51 in the direction of arrow B is blocked, such that the inner member 83 and the outer member 81 are coupled and the overrunning clutch 79 is in its engaged state. In case of rotation of the outer member 81 relative to the inner member 83 about the longitudinal axis a of the support shaft 51 in the direction of arrow C, the rollers 87 roll in the pockets 95 that are provided at the bottom of the ramps 89. While in the pockets 95 the rollers 87 do not block rotation of the outer member 81 relative to the inner member 83 about the longitudinal axis a of the support shaft 51 in the direction of arrow C. The outer member 81 and the inner member 83 are in that case not coupled by means of the rollers 87 and the overrunning clutch 79 is in its unengaged state. Thus the overrunning clutch 79 blocks rotation of the drive shaft 63 that is coupled to the outer member 81, relative to the support shaft that is coupled to the inner member 83, about the longitudinal axis a of the support shaft 51 in the direction of arrow B, while it allows said relative rotation in opposite direction indicated by arrow C.

In operation the output shaft 73 of the gearbox 57 drives the drive shaft 63 such that the drive shaft 63 is rotated about the central longitudinal axis a of the support shaft 51 in the direction of arrow C. Starting from a situation in which the support shaft 51 does not rotate about its central longitudinal axis a, if the drive shaft 63 is driven by the gearbox 57 and thus rotated about the central longitudinal axis a of the support shaft 51 in the direction of arrow C, the overrunning clutch 79 is in its unengaged state, such that the drive shaft 63 is not coupled to the support shaft 51 by means of the overrunning clutch 79.

Figure 3A:
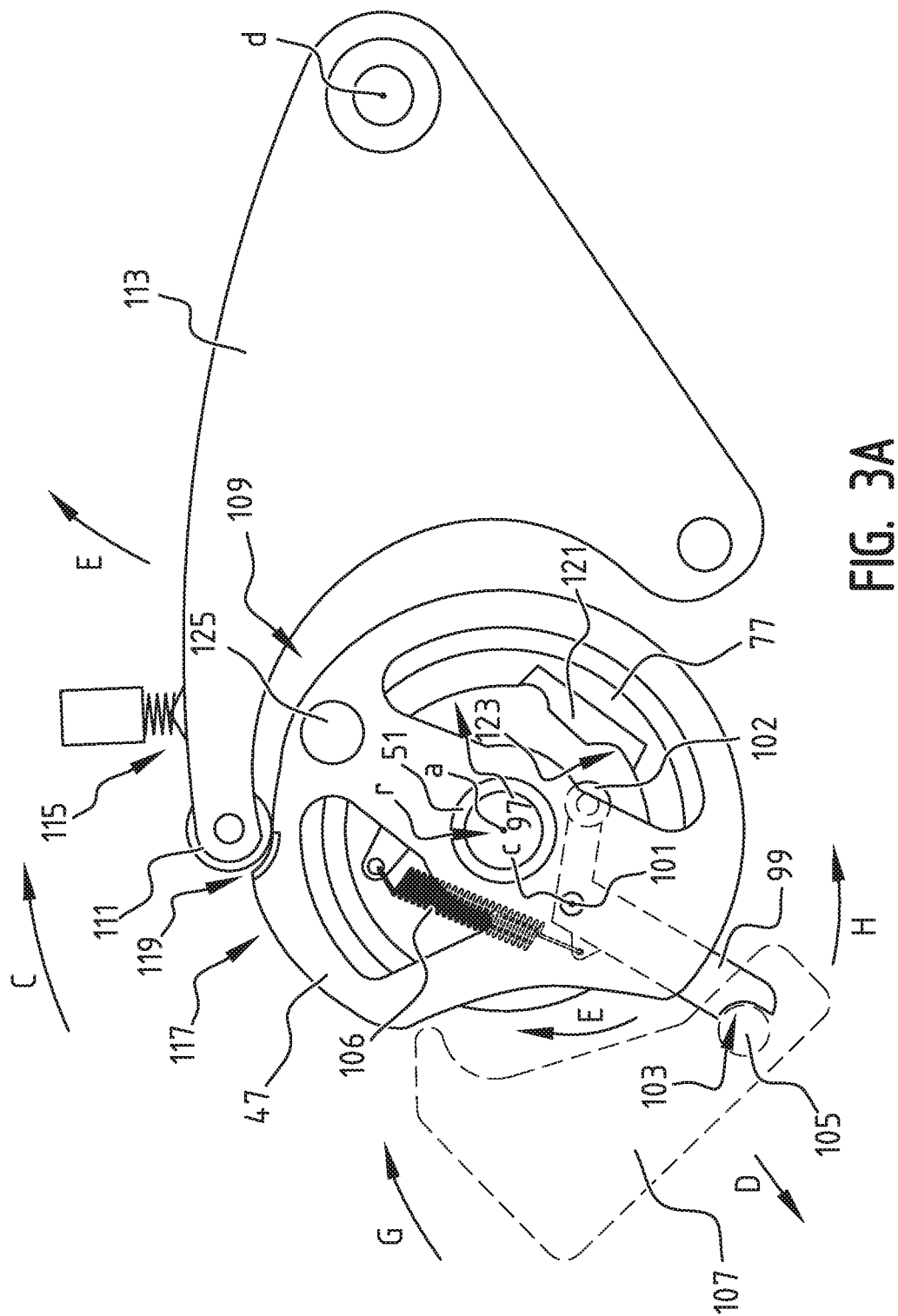
FIGS. 3A to 3G are schematic side views on the crank wheel arrangement of FIGS. 2A and 2B during various stages of operation.
Figure 3B:
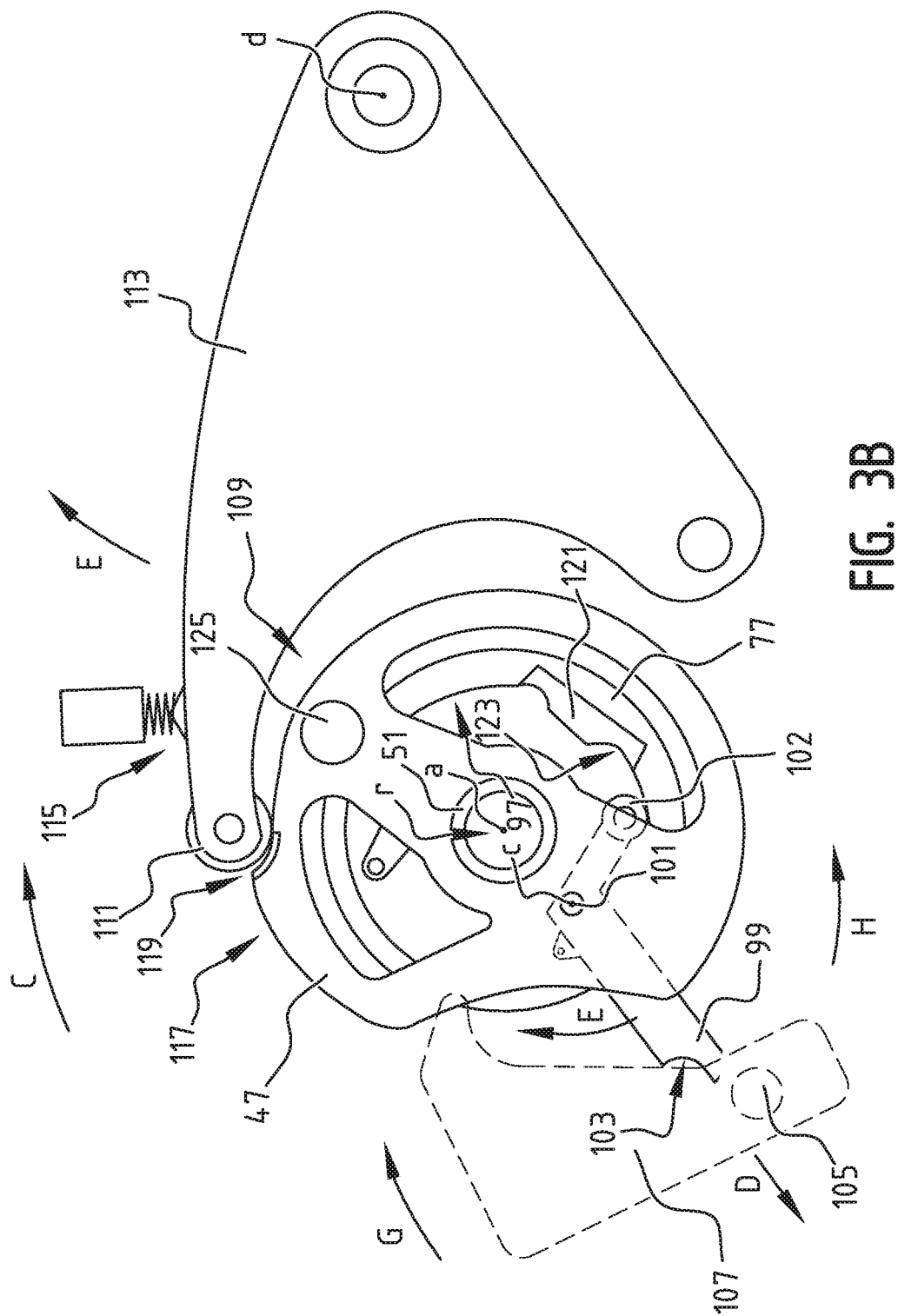

Referring now to FIGS. 2A, 3A, and 3B, the flange 77 at the outer end of the drive shaft 63 is C-shaped in cross-section and has an inner radial surface 97 that faces and extends parallel to the central longitudinal axis a of the support shaft 51 and that revolves about said longitudinal axis a at a radial distance R. A dog lever 99 is connected to the crank wheel 47 by means of a pivot 101, such that the dog lever 99 can pivot about a pivot axis c that is parallel to the central longitudinal axis a of the support shaft 51. The dog lever 99 is at one end thereof on one side of the pivot 101 provided with a wheel 102 and is at the other end on the other side of the pivot 101 provided with a recess 103 that in FIG. 3A is engaged by an engagement pen 105 of an actuator member 107. A spring 106 urges the recessed end of the dog lever 99 against the engagement pen 105.

In FIG. 3A the dog lever 99 is in a first position in which the wheel 102 is not in contact with the inner radial surface 97 of the flange 77. In FIG. 3A the crank wheel 47 does not rotate about the central longitudinal axis a. The crank wheel 47 serves as a cam and the outer radial surface 109 of the crank wheel 47 serves as a cam surface for a cam follower that is embodied by a cam follower wheel 111. The cam follower wheel 111 is arranged on a support member 113 that can pivot about a pivot axis d that is parallel to and stationary relative to the central longitudinal axis a of the support shaft 51. In FIG. 3A the cam follower wheel 111 is in contact with the outer radial surface 109 of the crank wheel 47. The support member 113 is in FIG. 3A in contact with a resilient stop member 115 that is arranged on a frame part of the baler 1 that is stationary relative to the central longitudinal axis a of the support shaft 51. The resilient stop member 115 is partly compressed, such that the cam follower wheel 111 is in biased contact the outer radial surface 109 of the crank wheel 47. The radial outer surface 109 has a stop that is embodied by a radially outwardly protruding part 117 that is preceded by a concave pocket 119 having substantially the same radius as the cam follower wheel 111. In FIG. 3A the cam follower wheel 111 is in engagement with the pocket 119. In order for the crank wheel 47 to rotate about the axis of rotation r in the direction of arrow C the cam follower wheel 111 has to be pushed out of the concave pocket 119 such that the support member 113 is rotated in the direction of arrow E against the force exerted thereon by the resilient stop member 115. With the cam follower wheel 111 in engagement with the pocket 119, rotation of the crank wheel 47 about the axis of rotation r in the direction of arrow C is prevented.

When in operation the drive shaft 63 is rotated about the central longitudinal axis a in the direction of arrow C driven by the output shaft of the gearbox 57, the flange 77 rotates about the central longitudinal axis a in the direction of arrow C. When the drive shaft 63 is rotated in the direction of arrow C, while the support shaft 51 and the crank wheel 47 do not rotate about the central longitudinal axis a of the support shaft 51, there is a relative rotation of the drive shaft 63 about the central longitudinal axis a in the direction of arrow C, such that, as described herein above, the overrunning clutch 79 is in its unengaged state, such that the drive shaft 63 is not coupled to the support shaft 51 by means of the overrunning clutch 79. As long as the dog lever 99 is in the first position in which the wheel 102 is not in contact with the inner radial surface 97 of the flange 77, the crank wheel 47 is also not coupled to the drive shaft 63 via the dog lever 99 and the flange 77.

Figure 3C:
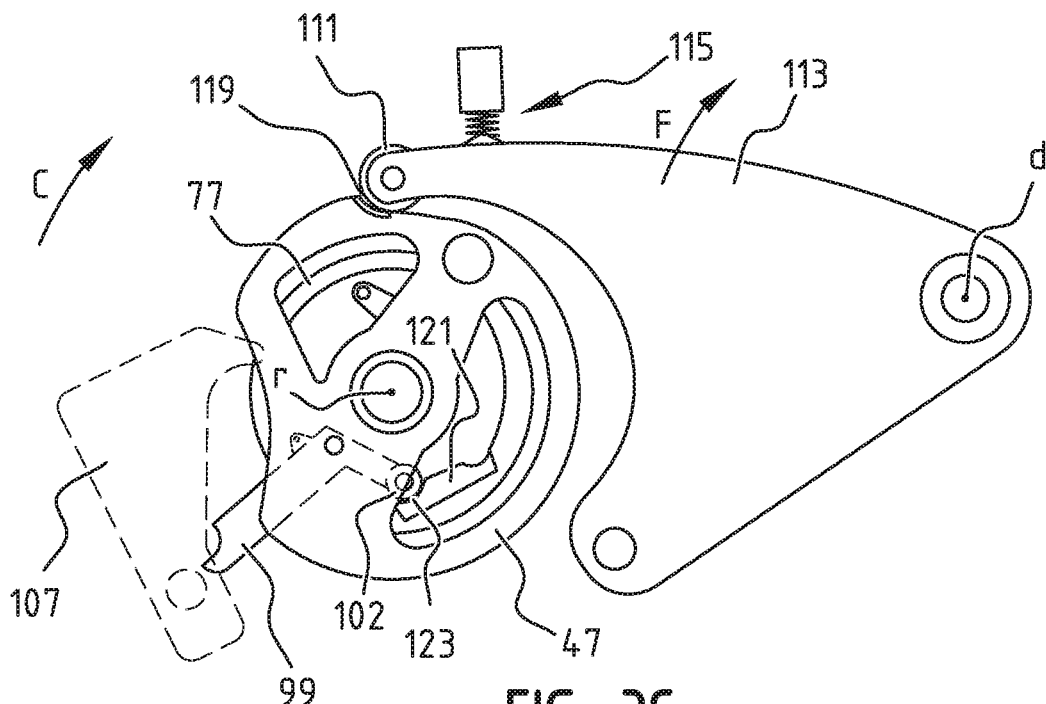
Figure 3D:
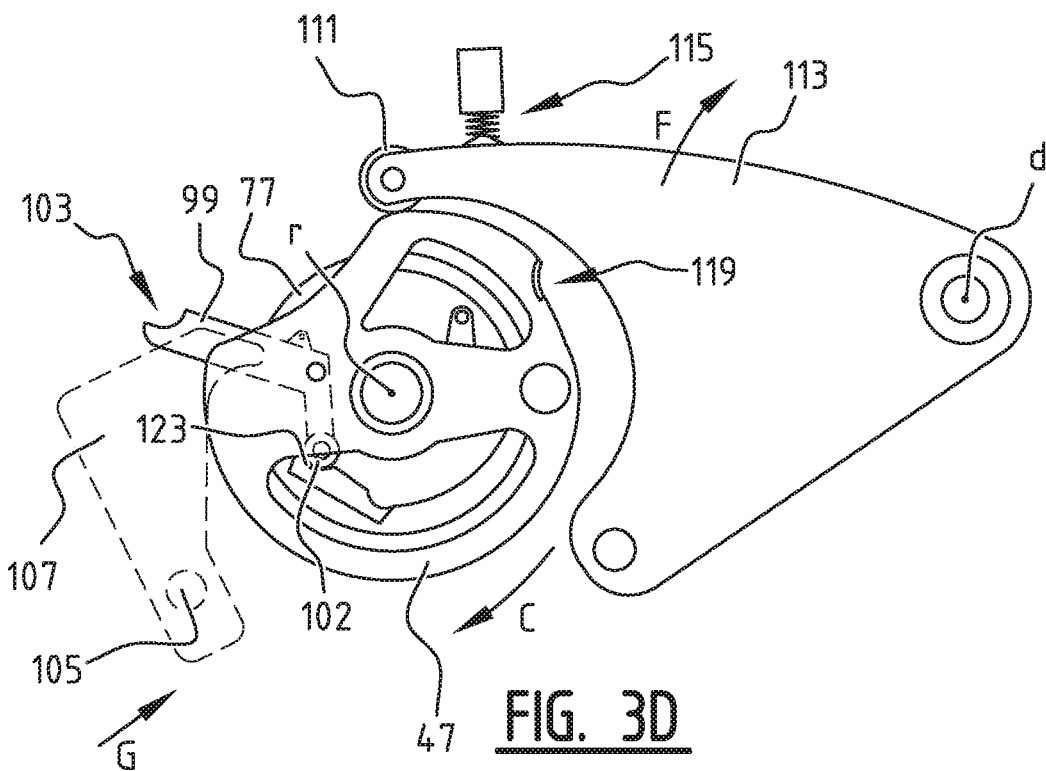

When the actuator member 107 is moved in the direction of arrow D, the engagement pin 105 is moved out of engagement with the recessed end 103 of the dog lever 99. The dog lever 99 is then no longer held in the first position and is pivoted about the pivot axis 101 in the direction of arrow E under influence of the spring 106 until the wheel 102 contacts the inner radial surface 97. The dog lever 99 is then in a second position that in shown in FIG. 3B. The inner radial surface 97 is provided with radially inward protruding protrusion 121. With the dog lever 99 in its second position and the flange 77 rotating about the central longitudinal axis a in the direction of arrow C, the wheel 102 enters a pocket 123 that precedes the protrusion 121, such that the dog lever 99 interlocks with the inner radial surface 97 of the flange 77. In that situation, shown in FIG. 3C, the crank wheel 47 is coupled to the drive shaft 63 via the dog lever 99 and the flange 77. The crank wheel 47 is then pushed by the flange 77 for rotation about the axis of rotation r in the direction of arrow C. As shown in FIG. 3D, the cam follower wheel 111 is as a result thereof pushed out of the concave pocket 119 such that the support member 113 is rotated in the direction of arrow F about pivot axis d against the force exerted thereon by the resilient stop member 115. The drive shaft 63 then drives the crank wheel 47 such that the crank wheel 47 and the dog lever 99 are rotated about the axis of rotation r in the direction of arrow C.

Figure 3E:
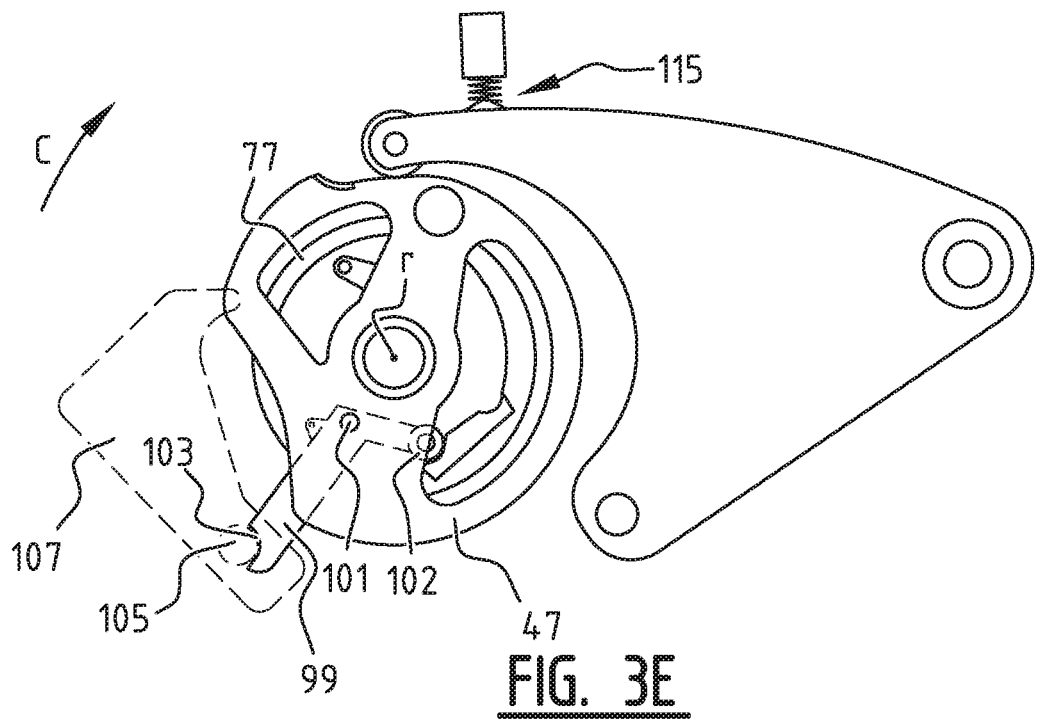
Figure 3F:
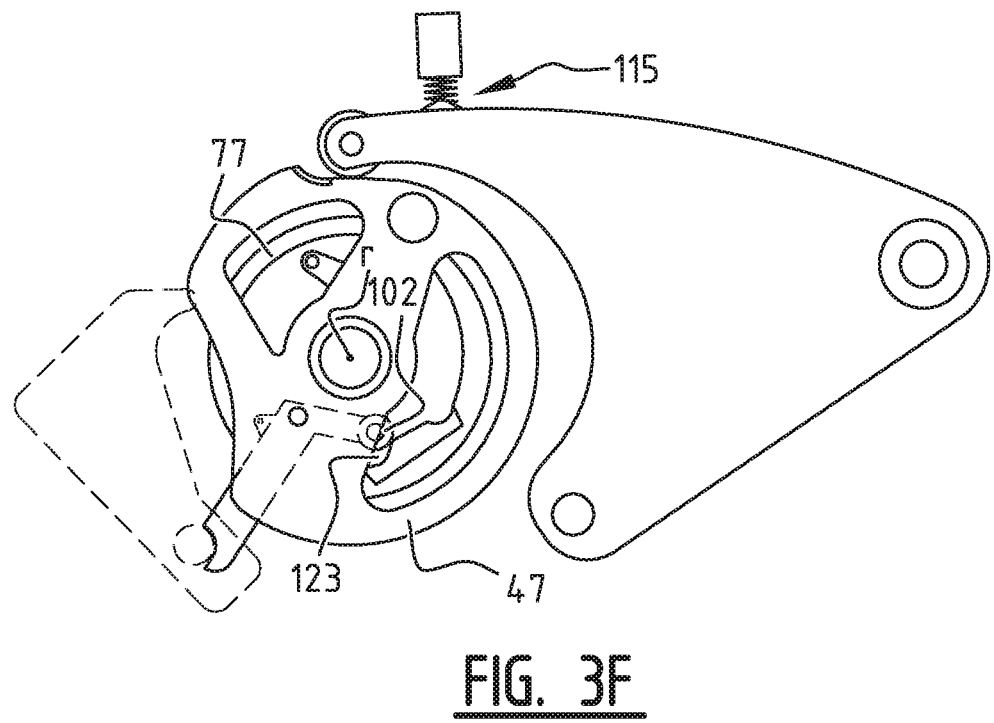
Figure 3G:
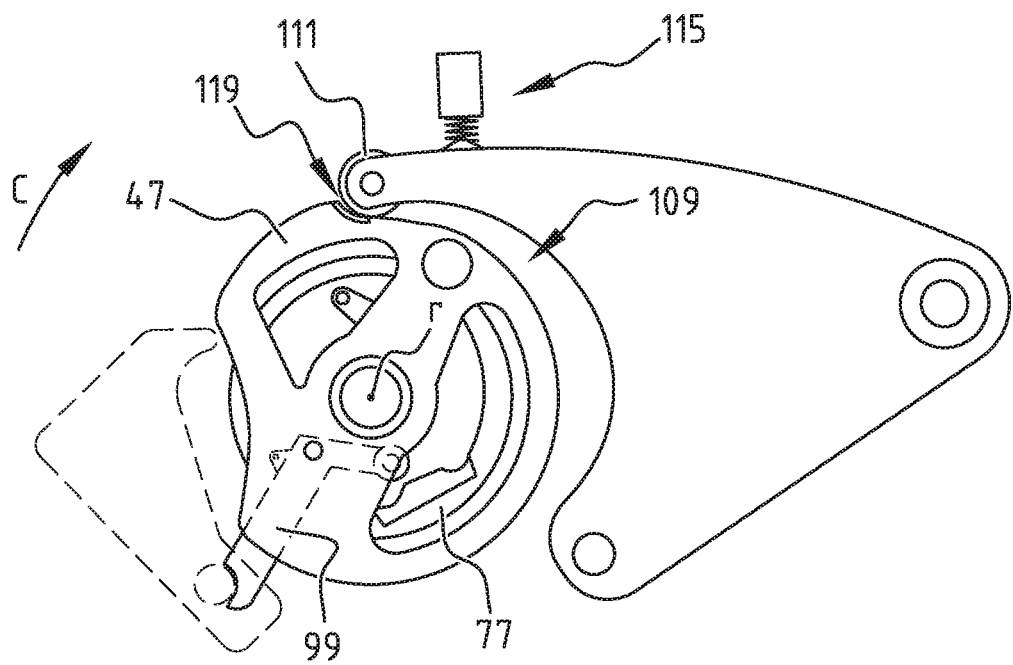

When subsequently the actuator member 107 is moved in the direction of arrow G, see FIG. 3D, the engagement pin 105 is moved in the path along which the recessed end 103 of the dog lever 99 is being rotated, such that the recessed end of the dog lever 99 engages the engagement pin 105 at a angular position of the crank wheel 47 shown in FIG. 3E. Further rotation of the crank wheel 47 about the axis of rotation r causes the dog lever 99 to pivot about the pivot axis c in the direction of arrow H, such that, as shown in FIG. 3F, the wheel 102 of the dog lever 99 is moved out of the pocket 123. As a result, the crank wheel 47 is no longer coupled to the drive shaft 63. Subsequently, as shown in FIG. 3G, the cam follower wheel 111 that is in biased contact with the outer radial surface 109 of the crank wheel 47 will engage the concave pocket 119, such that the rotation of the crank wheel 47 about the axis of rotation r in the direction of arrow C is stopped and further rotation of the crank wheel 47 about the axis of rotation r in the direction of arrow C is prevented until the dog lever 99 is brought into engagement with the flange 77 as described herein above.

The flange 77, dog lever 99 and actuator member 107 form a selectively operable dog clutch, in particular a radial dog clutch. The flange 77 having the inner radial surface 97 that is provided with radially inward protruding protrusion 121 is the driving clutch member of the dog clutch. The dog lever 99 that is arranged on the crank wheel 47 is the driven clutch member of the dog clutch. In case the dog clutch is configured such that the selectively operable dog clutch is disengaged when the crank wheel 47 has made one revolution about its axis of rotation, the clutch is a single revolution clutch.

Figure 4:
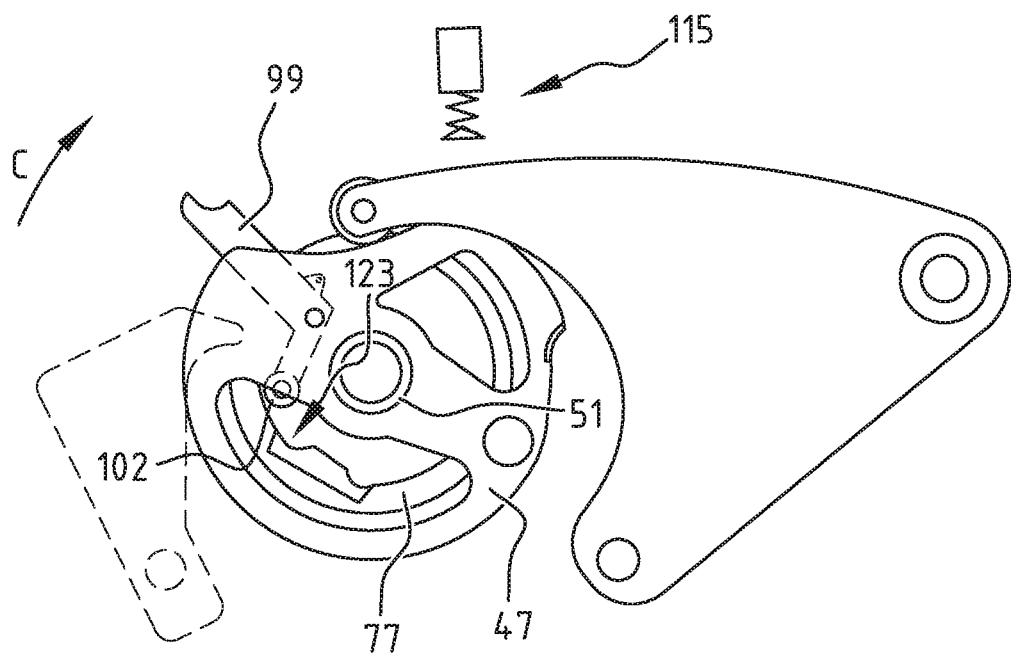
FIG. 4 is a schematic side view on the crank wheel arrangement of FIGS. 2A and 2B that illustrates the situation that is prevented in the baler according to the invention.

As described under reference to FIG. 1, the crank wheel 47 is provided with a crank pin at pivot 49 at a radial distance from the axis of rotation r, by means of which an end of the lever 45 of the stuffer fork assembly 39 is pivotally connected to the crank wheel 47. Rotation of the crank wheel 47 about the axis of rotation r imposes a movement on the fork assembly 39 that results in the tines 43 being moved along the kidney shaped path of movement P shown in FIG. 1. During the rotation of the crank wheel 47 about the axis of rotation r, the crank wheel 47 exerts forces on the lever 45 while the lever exerts forces on the crank wheel 47. In certain phases of the movement of the fork assembly, the forces exerted by the lever 45 on the crank wheel 47 are such that, in case the overrunning clutch 79 would not be present, the crank wheel 47 would be accelerated such that the rotational speed of the crank wheel 47 exceeds the rotational speed of the flange 77. As shown in FIG. 4 this would result in the wheel 102 of the dog lever 99 moving out of the pocket 123 in the direction of arrow C. The provision of the overrunning clutch 79 prevents the wheel 102 of the dog lever 99 moving out of the pocket 123 in the direction of arrow C. In case the rotational speed of the crank wheel 47 exceeds the rotational speed of the flange 77, the support shaft 51 fixed to the crank wheel 47 rotates relative to the drive shaft 63 to which the flange 77 is fixed about the central longitudinal axis a of the support shaft 51 in the direction of arrow C. Thus the rotation of the drive shaft 63 relative to the support shaft 51 about the central longitudinal axis a of the support shaft 51 is in the opposite direction, i.e. in the direction of arrow B. As described under reference to FIGS. 2A and 2B, the latter results in the overrunning clutch 79 to change into its engaged state, in which the drive shaft 63 and support shaft 51 are coupled and said relative rotation is blocked. Thus the overrunning clutch 79 prevents the rotational speed of the crank wheel 47 exceeding the rotational speed of the flange 77.

Figure 5:
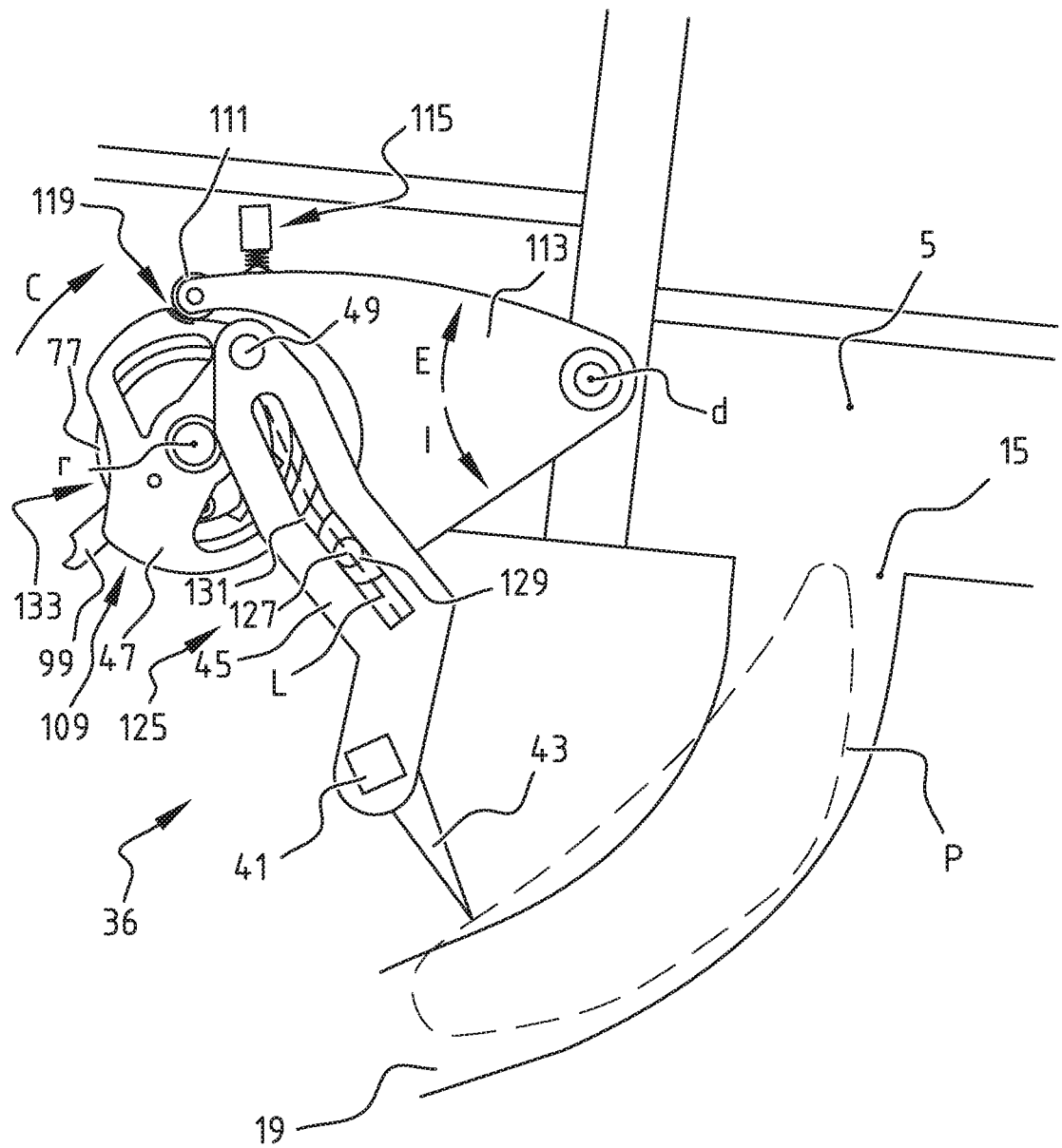
FIGS. 5 and 6 are schematic side views on the crank wheel arrangement of FIGS. 2A and 2B and FIGS. 3A to 3G during operation wherein the fork lever is additionally shown.

In FIG. 5 is shown that in the stuffer unit 36, the fork lever 45 carries at its rearmost end the tube 41 to which the elongated tines 43 are attached and is rotatably coupled at its foremost end with the crank wheel 47 through pivot 49. The fork lever 45 is operably supported by a guide 125 that allows relative movement of the fork lever 45 to a second pivot point 127 along a predetermined path relative to the lever 45. The guide 125 comprises a journal 129, coaxial with the second pivot point 127 and cooperating with an oblong slot 131 provided in the fork lever 45. The journal 129 fits closely between the longitudinal sides of the slot 131. Upon rotation of the crank wheel 47 about its axis of rotation r in the direction of arrow C, the second pivot point travels to and fro along a line L relative to and within the slot 131, resulting in the tines 43 being moved along the kidney shaped path of movement P.

In FIG. 5 the crank wheel 47 is in the angular position relative to its axis of rotation r that corresponds to the angular position shown in FIG. 3A. The dog lever 99 is in its first position, in which, as described under reference to FIG. 3A, the crank wheel 47 is not coupled to the drive shaft 63 by means of the dog lever 99 and the flange 77. The cam follower wheel 111 that is biased contact with the outer radial surface 109 of the crank wheel 47 and is in engagement with the concave pocket 119, prevents that the crank wheel 47 rotates about its axis of rotation r in the direction of arrow C under influence of the force exerted by the stationary fork assembly 39 on the crank wheel 47 as a result of its mass. In the angular position of the crank wheel 47 shown in FIG. 5, the tines 43 do not extend in the duct 19. The fork assembly is in its rest position.

When the crank wheel 47 is coupled to the drive shaft 63 by means of the dog lever 99 and flange 77, as described under reference to FIGS. 3A to 3D, the crank wheel 47 is rotated about its axis of rotation r in the direction of arrow C and the stuffer fork assembly 39 is moved such that the tines 43 are moved along the kidney shaped path P in one revolution of the crank wheel 47 about its axis of rotation. At the end of the said revolution, the crank wheel 47 and the drive shaft 63 may be uncoupled as described under reference to FIGS. 3E to 3G, such that the fork assembly stops and is held in its rest position, shown in FIG. 5, once the tines 43 have finished one journey along the kidney shaped path of movement P.

Figure 6:
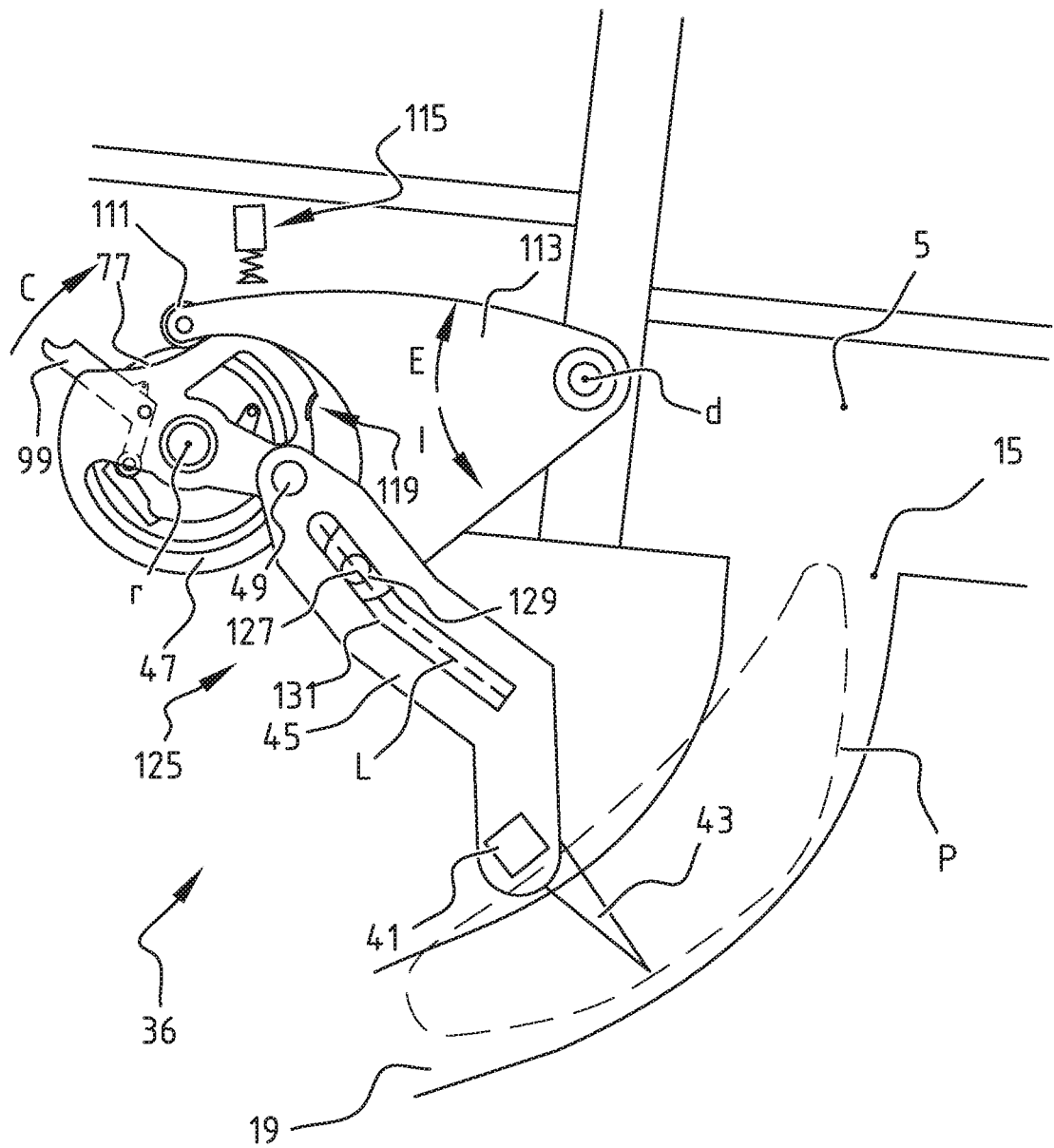

As shown in FIG. 5 the second pivot point 127 is fixed to the support member 113 that is pivotable about pivot axis d and that has arranged thereon the cam follower wheel 111. As a result thereof, the second pivot point 127 can be moved relative to the pivot axis d, wherein the movement of the second pivot point 127 is controlled by means of the radial outer surface 109 of the crank wheel 47 and the cam follower wheel 111 that is in contact therewith. As shown, the outer radial surface 109 of the crank wheel 47 has a radial depression 133 along a part of the circumference of the outer radial surface 109. The cam follower wheel 111 runs along the radial depression 133 when the tines are moved along the part of the path of movement P where the tines extend in the duct 19 and are moved towards the inlet 15 of the baling chamber 5. While the cam follower wheel 111 runs along the radial depression 133, the second pivot point 127 is first moved in the direction of arrow I about pivot axis d under influence of the force exerted by the fork lever 45 on the second pivot point 127 and is subsequently moved in opposite direction indicated by arrow E. Such movement of the second pivot point 127 results in an advantageous alteration of the speed course of the tines 43 as described in EP 0636 308. In FIG. 6 one angular position of the crank pin 49 is shown with the cam follower wheel 111 being in contact with the radial outer surface 109 of the crank wheel 47 at the depression 133. After moving through the radial depression 133, the cam following wheel 111 continues its path along the radial outer surface 109 of the crank wheel 47 towards the stop embodied by the radially outward protruding part 117 and preceding concave pocket 119, until it engages the concave pocket 119 as shown in FIG. 5.

The arrangement wherein the second pivot point 127 and the cam follower wheel 111 are both arranged on the same support member is advantageous in that the cam follower wheel 111 and outer radial surface of the crank wheel can be used for moving the second pivot point and for stopping and holding the crank wheel in the angular position that corresponds to the rest position of the fork assembly. Alternatively, two distinct cam follower wheels are applied, one for the movement of the second pivot point and one for stopping and holding the crank wheel in the angular position that corresponds to the rest position of the fork assembly. It would also be possible that there is no provision for moving the second pivot point. It would also be possible that there is no cam arrangement for stopping and holding the crank wheel in the angular position that corresponds to the rest position of the fork assembly. In the latter case a friction brake could be used for stopping and holding the crank wheel in the angular position that corresponds to the rest position of the fork assembly.

In FIG. 2A the overrunning clutch 79 is mounted to a flange 75 at the inner end of drive shaft 63. Alternatively, the overrunning clutch 79 is embodied as an overrunning bearing by means of which the drive shaft 63 bears on the support shaft 51 instead of bearings 65 and 67.

In FIG. 2A the overrunning clutch is of the roller ramp type. Alternatively, the overrunning clutch is of the sprag type or wedge ramp type.

Figure 7:
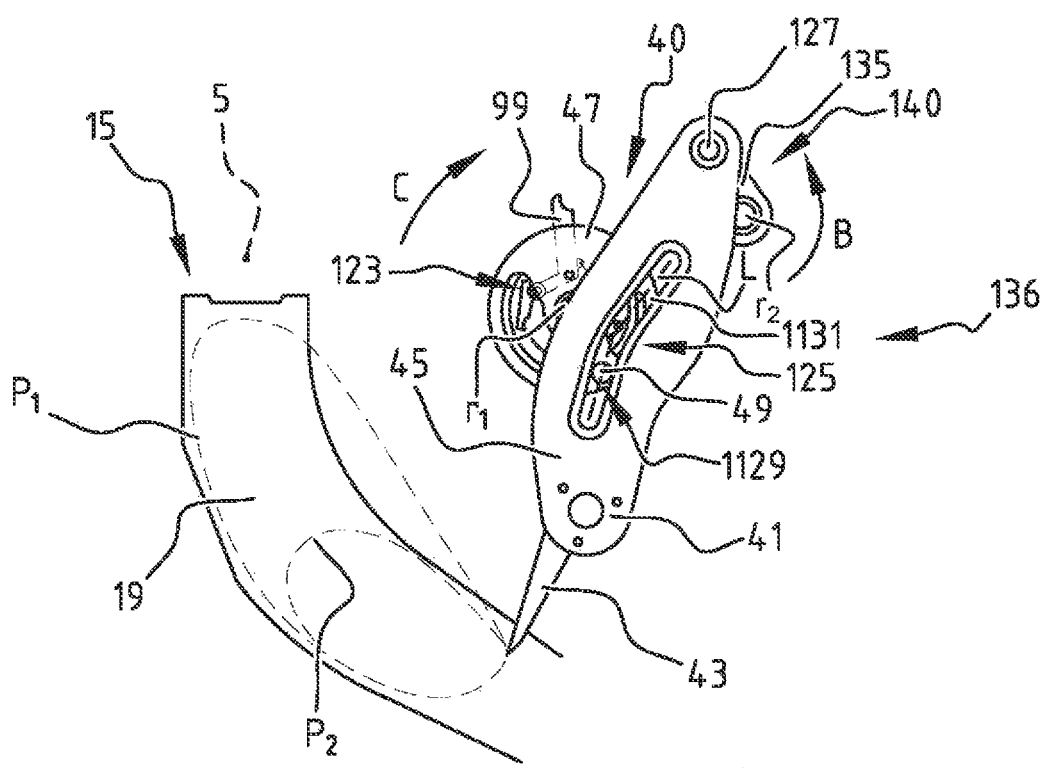
FIGS. 7 and 8 are schematic side views on two alternative embodiments of the arrangement shown in FIGS. 5 and 6.
Figure 8:
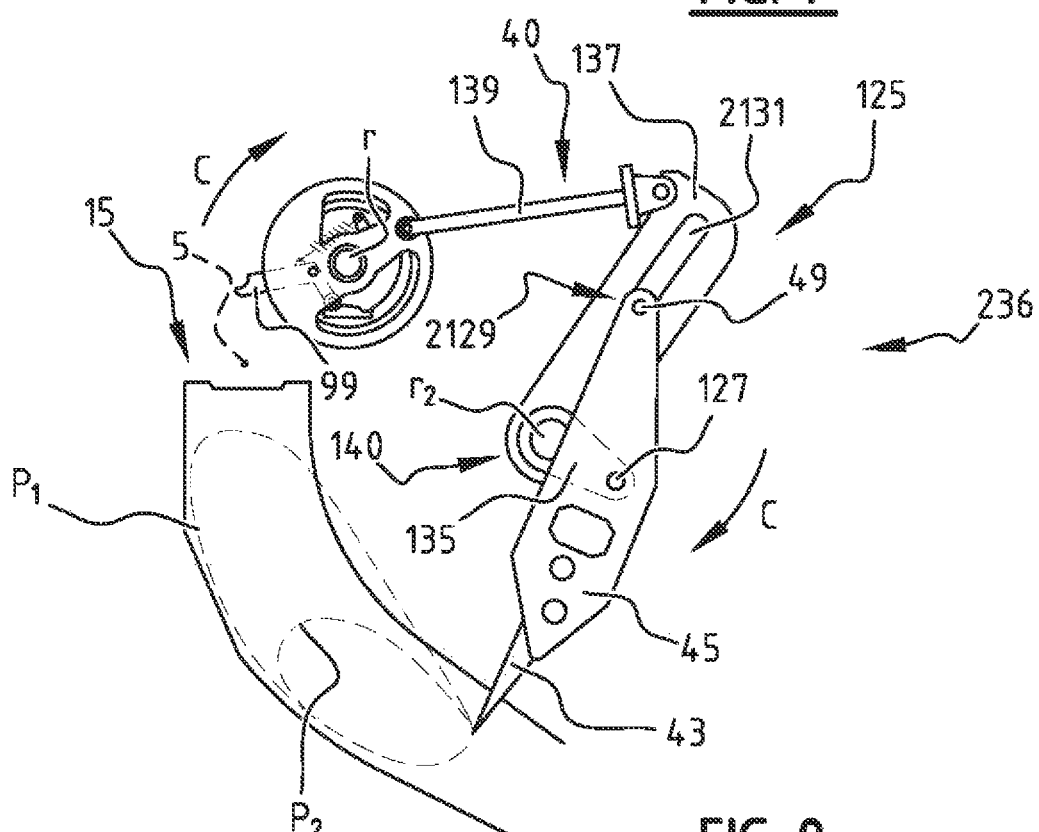

In FIGS. 7 and 8 two alternative embodiments 136, 236 are shown of the stuffer unit 36 shown in FIGS. 5 and 6.

In FIG. 7 is shown that the fork lever 45 of stuffer unit 136 is acted upon by a first drive mechanism 40, in particular a crank mechanism, comprising a first crank, embodied by crank wheel 47 at a first pivot point 49 on the one hand, and is acted upon by a second drive mechanism 140, in particular a crank mechanism, comprising a second crank 135, embodied by a crank arm, at a second pivot point 127 on the other hand.

In FIG. 7 is shown that the fork lever 45 carries at its rearmost end the tube 41 to which the elongated tines 43 are attached and is rotatable coupled at its foremost end with the second crank 135 through second pivot point 127. The fork lever 45 is operably supported by a guide 125, embodied by a cam track and cam track follower arrangement, that allows relative movement of the fork lever 45 to the first pivot point 49 along a predetermined path relative to the lever 45. The guide 125 comprises a journal 1129, coaxial with the first pivot point 49 and cooperating with an oblong slot 1131 provided in the fork lever 45. The journal 1129 fits closely between the longitudinal sides of the slot 1131. The oblong slot 1131 embodies a cam track, while the journal 1129 embodies a cam track follower.

Crank wheel 47 is arranged in accordance with FIGS. 2A, 2B, and can be selectively driven by drive shaft 63 in accordance with the description herein above that refers to FIGS. 3A to 3G and FIG. 4. However, the cam and cam follower arrangement shown in said figures for stopping the rotation of crank wheel 47 and holding the crank wheel 47 in a certain angular position is dispensed with. Instead a friction brake is provided (not shown) that acts on the crank wheel 47 or support shaft 51, which friction brake is selectively engageable for stopping the rotation of crank wheel 47 and holding the crank wheel 47 in a certain angular position when the dog lever 99 is disengaged from pocket 123. Thus crank wheel 47 is selectively rotatable about its axis of rotation r in the direction of arrow C by means of the drive shaft 63 that in turn is driven by gear box 57.

Second crank 135 is during operation of the baler rotated about its axis of rotation $r_2$ in the direction of arrow B by means of a second drive shaft (not shown) that is driven by the gear box 57.

In FIG. 7 dog lever 99 is in engagement with pocket 123, such that crank wheel 47 is rotated about its axis of rotation r in the direction of arrow C. The combined rotation of crank wheel 47 in the direction of arrow C and of second crank 135 in the direction of arrow B results in the tines 43 being moved along a path of movement $P^1$. While being moved along a path of movement $P^1$ the tines 43 push material present in the duct 19 in upward direction in the baling chamber 5 via the inlet 15 of the baling chamber. The stuffer unit is then in a stuffer mode. While the crank wheel 47 is rotated in the direction of arrow C, the overrunning clutch 79 shown in FIGS. 2A and 2B prevent the crank wheel 47 preceding the flange 77 of the drive shaft 63 as described under reference to FIG. 4.

When the dog lever 99 is not in engagement with pocket 123 and the crank wheel 47 is stopped and held at the angular position shown in FIG. 7 by means of the friction brake, the rotation of second crank 135 in the direction of arrow B results in the tines 43 being moved along a path of movement $P_2$. While being moved along a path of movement $P_2$ the tines 43 accumulate material in the duct 19. The stuffer unit is then in a packer mode.

Since the stuffer unit 136 as shown in FIG. 7 can operate in a stuffer mode and a packer mode as described herein above, the packer unit 35 of the baler 1 shown in FIG. 1 can be dispensed with and may be replaced by for instance a rotor for transporting material picked up by the pick-up 29 into the operating range of the tines 43.

In the stuffer unit 236 shown in FIG. 8, the fork lever 45 is acted upon by a first drive mechanism 40, comprising a first crank, embodied by crank wheel 47, a drive rod 139, and a slot plate 137, at a first pivot point 49 on the one hand, and is acted upon by a second drive mechanism 140, comprising a second crank 135, embodied by a crank arm, at a second pivot point 127 on the other hand. The crank wheel 47 is arranged for rotation about a first axis of rotation r. The second crank 135 is arranged for rotation about a second axis of rotation $r_2$.

In FIG. 8 is shown that the fork lever 45 carries at its rearmost end elongated tines 43 and is coupled in between its foremost end and rearmost end with the second crank 135 through second pivot point 127. The fork lever 45 is operably supported at its foremost end at a first pivot point 49 by a guide 125, embodied by a cam track and cam track follower arrangement, that allows relative movement of the first pivot point 49 along a predetermined path relative to a slot plate 137. The guide 125 comprises a journal 2129, coaxial with the first pivot point 49 and cooperating with an oblong slot 2131 provided in the slot plate 137. The journal 2129 fits closely between the longitudinal sides of the slot 2131. The oblong slot 2131 embodies a cam track, while the journal 2129 embodies a cam track follower. The slot plate 137 is at one end also rotatably arranged about the second axis of rotation $r_2$ and is at its other end acted upon by the crank wheel 47 via drive rod 139, such that rotation of crank wheel 47 about its axis of rotation r results in an cyclic angular movement of the slot plate 137 about the second axis of rotation $r_2$ that is transmitted to first pivot point 49.

Crank wheel 47 is arranged in accordance with FIGS. 2A, 2B, and can be selectively driven by drive shaft 63 in accordance with the description herein above that refers to FIGS. 3A to 3G and FIG. 4. However, the cam and cam follower arrangement shown in said figures for stopping the rotation of crank wheel 47 and holding the crank wheel 47 in a certain angular position is dispensed with. Instead a friction brake is provided (not shown) that acts on the crank wheel 47 or support shaft 51, which friction brake is selectively engageable for stopping the rotation of crank wheel 47 and holding the crank wheel 47 in a certain angular position when the dog lever 99 is disengaged from pocket 123. Thus crank wheel 47 is selectively rotatable about its axis of rotation r in the direction of arrow C by means of the drive shaft 63 that in turn is driven by gear box 57.

Second crank 135 is during operation of the baler rotated about its axis of rotation $r_2$ in the direction of arrow C by means of a second drive shaft (not shown) that is driven by the gear box 57.

In FIG. 8 dog lever 99 is in engagement with pocket 123, such that crank wheel 47 is rotated about its axis of rotation r in the direction of arrow C. The combined rotation of crank wheel 47 in the direction of arrow C and of second crank 135 in the direction of arrow C results in the tines 43 being moved along a path of movement $P_2$. While being moved along a path of movement $P_2$ the tines 43 accumulate material in the duct 19. The stuffer unit is then in a packer mode.

When the dog lever 99 is not in engagement with pocket 123 and the crank wheel 47 is stopped and held at the angular position shown in FIG. 8 by means of the friction brake, the rotation of second crank 135 in the direction of arrow C results in the tines 43 being moved along a path of movement $P^1$. While being moved along a path of movement $P^1$ the tines 43 push material present in the duct 19 in upward direction in the baling chamber 5 via the inlet 15 of the baling chamber. The stuffer unit is then in a stuffer mode. While the crank wheel 47 is rotated in the direction of arrow C, the overrunning clutch 79 shown in FIGS. 2A and 2B prevent the crank wheel 47 preceding the flange 77 of the drive shaft 63 as described under reference to FIG. 4.

Since the stuffer unit 236 as shown in FIG. 8 can operate in a stuffer mode and a packer mode as described herein above, the packer unit 35 of the baler 1 shown in FIG. 1 can be dispensed with and may be replaced by for instance a rotor for transporting material picked up by the pick-up 29 into the operating range of the tines 43.

In the embodiments of the invention shown in FIGS. 1 to 8 the fork assembly includes a pivotable fork lever on which the tines are arranged. It is also possible that the fork assembly does not include a fork lever. For instance the fork assembly may include one or more rotatable arms having rotatably arranged thereon a tine bar. Such a fork assembly is for instance described in EP0236578.

In the embodiments of the invention shown in FIGS. 1 to 8 at least some cranks are embodied by crank wheels. Alternatively, a crank embodied by a crank wheel can be embodied by a crank arm. In order to replace a crank wheel that provides the cam surface 109 with a crank arm, the replacing crank arm is provided with a radial extension that provides the cam surface. Examples of such crank arms are shown in EP 0636 308.

Although the principles of the invention have been set forth above with reference to specific embodiments, it must be understood that this description is given solely by way of example and not as limitation to the scope of protection, which is defined by the appended claims.

The invention claimed is:

1. An agricultural baler comprising:
a bale case comprising a wall portion having an entrance opening for introduction of crop material;
a plunger disposed for movement in the bale case to thereby compact the crop material into bales;
a duct for transporting the crop material to the entrance opening;
a stuffer unit operably associated with the duct and comprising:
a fork assembly comprising tines;
a drive mechanism acting on the fork assembly; and
a clutch arrangement for selective coupling the drive mechanism to a power source of the agricultural baler, the clutch arrangement comprising:
a selectively operable dog clutch comprising a driving clutch member and a driven clutch member that are arranged for rotation about a shared axis of rotation, wherein the driving clutch member and the driven clutch member are configured for selectively engaging each other in one direction of rotation of the driving clutch member relative to the driven clutch member; and
an overrunning clutch associated with the driving clutch member and the driven clutch member, the overrunning clutch configured for engaging in an opposite direction of rotation of the driving clutch member relative to the driven clutch member,
wherein the stuffer unit further comprises a support shaft which defines a longitudinal axis,
wherein the dog clutch and the overrunning clutch are connected to the support shaft, and
wherein the overrunning clutch comprises an inner member connected to the support shaft, an outer member connected to the driving clutch member and coaxial with the inner member, and a one-way coupling mechanism disposed therebetween.

2. The agricultural baler according to claim 1, further comprising a cam arrangement comprising a cam and a cam follower,
wherein one of the cam and the cam follower is associated with the driven clutch member and the other one of the cam and the cam follower is arranged such that when the driven clutch member is rotated about its axis of rotation, the cam follower is in biased contact with and follows a cam surface of the cam over at least part of angular positions of the driven clutch member about its axis of rotation, wherein the cam surface comprises a stop that is engaged by the cam follower when the driven clutch member is in an angular position about its axis of rotation that corresponds to a rest position thereof.

3. The agricultural baler according to claim 2, further comprising a resilient member that is at least partly compressed or stretched when the cam follower is in contact with the cam surface of the cam.

4. The agricultural baler according to claim 2, wherein the drive mechanism comprises at least one first crank that is rotatable about a first axis of rotation and that is associated with the driven clutch member.

5. The agricultural baler according to claim 4, wherein one of the cam and the cam follower is connected to or arranged on the first crank.

6. The agricultural baler according to claim 5, wherein:
the fork assembly further comprises at least one fork lever having arranged thereon the tines; and
the fork lever is acted upon by the first crank at a first pivot point on one hand, and operably supported at a second pivot point on the other hand.

7. The agricultural baler according to claim 6, wherein the fork lever is operably supported at the second pivot point by a guide, allowing movement of the fork lever relative to the second pivot point along a predetermined path relative to the fork lever.

8. The agricultural baler according to claim 7, wherein:
the second pivot point is fixed to a support member that is movable relative to the first axis of rotation of the first crank; and
one of the cam and the cam follower is connected to or arranged on the first crank and the other one of the cam and the cam follower is connected to or arranged on the support member.

9. The agricultural baler according to claim 7,
wherein the stuffer unit further comprises at least one second crank rotatable about a second axis of rotation, and
wherein the second crank acts upon the fork lever at the second pivot point for moving the second pivot point relative to the second axis of rotation.

10. The agricultural baler according to claim 7, wherein:
the guide comprises a journal coaxial with the second pivot point and cooperating with an oblong slot provided in the fork lever,
the journal fits closely between longitudinal sides of the slot, and
upon rotation of the first crank, the second pivot point travels to and fro along a single line relative to and within the slot.

11. The agricultural baler according to claim 9, wherein the first crank acts upon the fork lever at the first pivot point via a cam track and an associated cam track follower.

12. The agricultural baler according to claim 11, wherein a position of the first pivot point is defined by the cam track, wherein the cam track is arranged on the fork lever and is engaged by the cam track follower that is acted upon by the first crank.

13. The agricultural baler according to claim 11, wherein a position of the first pivot point is defined by the cam track, the cam track acted upon by the first crank, the cam track engaged by the cam track follower on the fork lever.

14. The agricultural baler according to claim 1, wherein the overrunning clutch is one of a roller ramp overrunning clutch, a sprag overrunning clutch, and a wedge ramp overrunning clutch.

15. The agricultural baler according to claim 1, wherein the selectively operable dog clutch is a radial dog clutch.

16. The agricultural baler according to claim 1, wherein the selectively operable dog clutch is a single revolution clutch.

17. The agricultural baler according to claim 1, wherein the driven clutch member of the dog clutch is spaced apart from the overrunning clutch along the longitudinal axis.

* * * * *